United States Patent [19]
Hataoka et al.

[11] Patent Number: 4,590,605
[45] Date of Patent: May 20, 1986

[54] METHOD FOR PRODUCTION OF SPEECH REFERENCE TEMPLATES

[75] Inventors: Nobuo Hataoka, Hachioji; Akira Ichikawa, Musashino, both of Japan

[73] Assignee: Hitachi, Ltd., Tokyo, Japan

[21] Appl. No.: 449,660

[22] Filed: Dec. 14, 1982

[30] Foreign Application Priority Data

Dec. 18, 1981 [JP] Japan .................. 56-203731

[51] Int. Cl.⁴ .................................. G10L 1/00
[52] U.S. Cl. ................................... 381/43
[58] Field of Search .................. 381/41-50

[56] References Cited
U.S. PATENT DOCUMENTS 4,181,821  1/1980  Pirz et al.
4,363,102  12/1982  Holmgren et al. ............. 381/42

OTHER PUBLICATIONS

Rabiner, et al., "Speaker-Independent Recognition of Isolated Words Using Clustering Techniques," *IEEE Transactions on ASSP*, vol. ASSP-27, No. 4, Aug. 1979, pp. 336-349.

*Primary Examiner*—E. S. Matt Kemeny
*Attorney, Agent, or Firm*—Antonelli, Terry & Wands

[57] ABSTRACT

In this speech recognition system, a set of templates for each phoneme includes clusters of speech patterns based on two speech features: "physical" features (formant spectra of men versus women) and "utterance" features (unvoiced vowels and nasalization), derived from a plurality of reference speakers.

3 Claims, 8 Drawing Figures

METHOD FOR PRODUCTION OF SPEECH REFERENCE TEMPLATES

This invention relates to a method for the production of speech reference templates which is adapted for setting up plural speech patterns belonging to the same category as reference templates for each category in a speech recognition apparatus.

In many applications, the reference template in speech recognition apparatus designed for unspecified speakers is constituted by an average pattern of speeches spoken by plural speakers or a multi-template comprised of plural reference templates. A conventional method for production of reference templates, predicated on either type of the reference template, extracted a feature factor of speech which makes no distinction between two kinds of features, that is, physical features of the speech dependent on individualities of speakers and features of the speech which occur by utterance such as for example unvoicing of vowels, and set up an average speech pattern or plural reference templates. As a result, the conventional method faced difficulties in production of the reference template which can draw a complete distinction between the two kinds of features and which can be representative of details of a feature of speeches spoken by a number of speakers.

Also, a conventional method for classifying the speech patterns representative of the same contents into plural sets utilized either simple classification based on observation of a speech spectrum or clustering techniques in which an initial, representative speech pattern is established for each of the sets and a speech pattern similar to the initial, representative speech pattern is alotted to the corresponding set (for example, k-means iteration techniques; IEEE Trans. on Acoust., *Speech and Signal Processing*, Vol. ASSP-27, No. 2, Apr. 79, "Interactive Clustering Techniques for Selecting Speaker-Independent Reference Templates for Isolated Word Recognition:" by S. E. Levinsion, L. R. Rabiner et al.). However, uncertainty was involved in the classification based on observation, and extremely different results were obtained dependent on the initially set representative speech patterns in the clustering techniques which require initial setting of the representative speech patterns.

The present invention contemplates elimination of the conventional problems.

An object of the invention is to provide a method for reproduction of reference templates which can be representative of details of speeches spoken by a number of speakers.

Another object of the invention is to provide a precise and reliable clustering technique suitable for the production method which does not depend on any representative speech patterns initially set.

According to one feature of the invention, a method for production of reference templates comprises a first step of classifying speakers into sets of speakers on the basis of the difference in physical features of the speakers by using speeches spoken by the speakers which are stable by utterance, and a second step of classifying the speakers on the basis of the difference in features which occur by utterance in each of the sets of speakers to produce a reference template representative of details of speeches spoken by the speakers.

According to another feature of the invention, there is provided a hierarchical clustering suitable for the above classification which is based on distance measure (similarity measure) used for recognition of speeches to effect preferential classification of speakers having the most similarity in speech into the same set of speakers.

Firstly, the principle of the invention will be described.

Generally, the feature of a speech spoken by a speaker draws a distinction between two kinds of features, that is, physical features inherent to the speaker which depends on individuality of the vocal organs, such as the vocal tract and nasal cavity of the speaker, and features which occur by utterance and depend on whether original features inherent to a phoneme appear or disappear in accordance with the position of the phoneme in a variety of speeches uttered.

Figure 1:
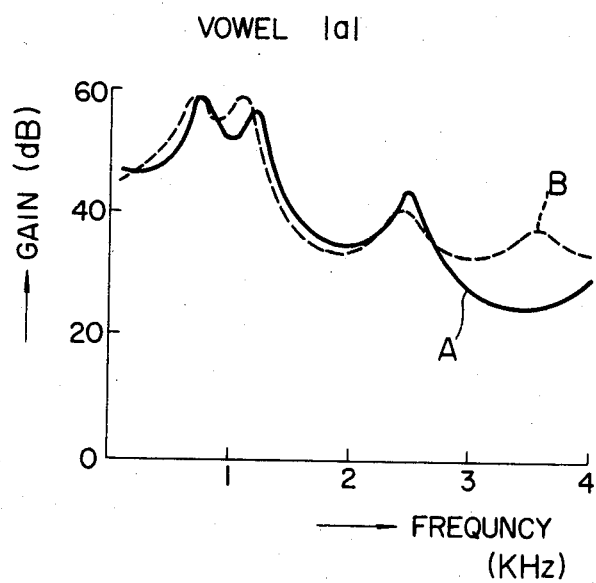
FIG. 1 is a graph showing general forms of spectra of a vowel |a| spoken by speakers having different physical features of speech.

FIG. 1 shows general forms of spectra of a vowel |a| spoken by speakers A and B to indicate the difference in speech due to difference in physical features of the vocal organs of the speakers. In the figure, the abscissa represents frequency and the ordinate represents gain. Peaks at formant frequencies on the spectra indicate features inherent to a phoneme (vowel |a| in this example). The difference in physical features of the speakers results in a shift of formant frequencies (shift of peaks), different sensitivity of resonance and different inclination over the forms of spectra, as will clearly be seen from the general spectrum forms by the speaker A (solid curve) and the speaker B (dotted curve) which are shifted from each other.

Figure 2:
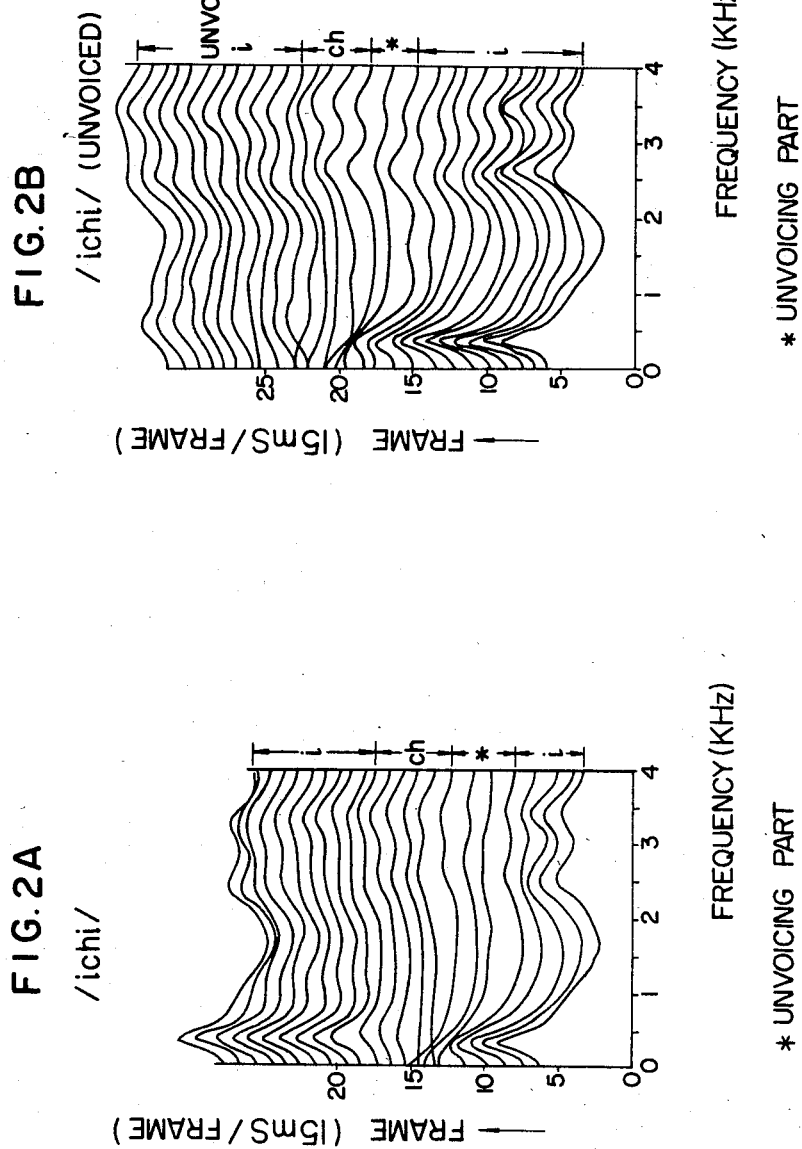
FIGS. 2A and 2B are graphs showing general forms of spectra of a speech /ichi/ to indicate the difference in features of speech which occur by utterance.

Involved in the features of speech which occur by utterance, on the other hand, are the so-called phenomenon of unvoicing of vowels or the phenomenon of nasalization in which acoustic features inherent to vowels disappear in accordance with the position of the vowels. In the phenomenon of unvoicing which takes place when vowels |i| and |u| are sandwiched by such unvoiced consonants as |p|, |t|, |k|, |h|, |s| and |ch| or when the speech terminates in the vowels, |i| and |u| are unvoiced in spite of the fact that the mouth figures to pronounce these vowels. Comparative examples of phenomenon of unvoicing appearing in a speech /ichi/ are shown in FIGS. 2A and 2B where the abscissa represents frequency and the ordinate represents time (frame, 15 msec/frame). Illustrated in FIG. 2A is an original, voiced /ichi/ in which |i| following |ch| appears clearly, and illustrated in FIG. 2B is an unvoiced /ichi/ in which a spectrum of the original |i| following |ch| disappears.

In recognition of a speech which exhibits sophisticated features as described above, it is necessary to distinctively deal with the physical features and the features which occur by utterance. If speech recognition is effected with a so-called multi-template which makes no distinction between the two kinds of features and in which a plurality of reference templates are prepared for the same speech, these features will be entangled, thus making it difficult to produce highly precise reference templates. For example, when speeches /ichi/ spoken by 50 speakers are equally classified into 6 sets, the results are as follows:

$$
\begin{aligned}
W_1 &= \{1, 10, 16, 17, 21, 22, 27, 31, 33, 36, 50\} \\
W_2 &= \{\textcircled{23}, \textcircled{24}, \textcircled{35}, 48\} \\
W_3 &= \{2, \textcircled{5}, \textcircled{7}, \textcircled{8}, 9, 13, 18, 19, 20, 30, \\
&\qquad 32, 43, 44, 45, 49\} \\
W_4 &= \{3, 4, 12, 15, 25, 26, 28, \textcircled{34}, 37, 47\} \\
&\quad \triangle \triangle \triangle \quad \triangle \triangle \triangle \triangle \quad \triangle \quad \triangle \triangle \\
W_5 &= \{11, 29\} \\
&\quad \triangle \triangle \\
W_6 &= \{\textcircled{6}, 14, \textcircled{38}, \textcircled{39}, \textcircled{40}, \textcircled{41}, \textcircled{42}, \textcircled{46}\} \\
&\quad \triangle \triangle \qquad\qquad\qquad\qquad \triangle \triangle
\end{aligned}
\quad (1)
$$

where $W_1$ to $W_6$ denote sets (clusters) to be classified, numerical numbers denote the number assigned to the speakers, marks "o" denote female voices, and marks "$\triangle$" denote unvoiced speeches. Thus, the above classification is such that speakers of male voice and female voice who are extremely different in physical features are coexistent in the same set and speakers of voiced speech and unvoiced speech are coexistent in set $W_6$.

To avoid such coexistence of the physical features and features which occur by utterance, according to the invention, in the first step, classification of speakers into sets of speakers is effected on the basis of the difference in physical features of the speakers by using speeches which are stable by utterance (speeches which do not undergo unvoicing and nasalization) and, in the second step, classification of the speakers on the basis of the difference in features which occur by utterance is effected in each of the sets of speakers. And, for the above classifications of the speakers, a so-called automatic hierarchical clustering technique is employed which classifies the speakers into a set in accordance with grading of similarity in feature factor of speeches and which does not depend on initial, representative speech patterns.

The principle of the hierarchical clustering technique will now be described in greater detail. Firstly, a set or cluster $W_i$ is expressed by using elements $x^{(i)}$ as follows:

$$W_i = \{x_1^{(i)}, x_2^{(i)}, \ldots, x_{m_i}^{(i)}\}$$

$$N = \sum_{i=1}^{M} m_i$$

where N is the number of individuals, and M is the number of clusters. Initially the distance (or similarity) $d(x_k, x_l)$ between individuals $x_k$ and $x_l$ is required. And starting from the state of N clusters that each cluster contains one individual as a single element, the cluster merging process, that two clusters are merged into one cluster if the distance $D_{ij}$ between these two clusters is minimum, is iterated until the number of clusters M reaches a reasonable one. To sum up the above procedure:

(i) Distance $d(x_k, x_l)$ between individuals is determined;

(ii) Distance $D_{ij}$ between clusters is defined by, for example, maximum distance of $$D_{ij} = \max_{k,l} \{d(x_k^{(i)}, x_l^{(j)})\}$$

or average distance of $$D_{ij} = \underset{k,l}{aV} \{d(x_k^{(i)}, x_l^{(j)})\}$$

and the distance $D_{ij}$ is determined;

(iii) Clusters are merged into a new cluster in accordance with $$D_{ij} = \min_{i,j} D_{ij}, \quad W_i = W_i \cup W_j,$$

and (iv) The above (ii) and (iii) steps are repeated until the number of clusters reaches a desired value, where the number of repetitions of operations I is $1 \leq I \leq N - 1$.

Taking the number of individuals as 5, for instance, the above (i) to (iii) steps proceed until M = 1 is reached as detailed below.

(i) Distance between individuals is determined as follows:

| $x_k$ | \multicolumn{5}{c}{$x_l$} | | | | |
|---|---|---|---|---|---|
| $d(x_k, x_l)$ | | 1 | 2 | 3 | 4 | 5 |
| | 1 | | 5 | 10 | 10 | 20 |
| | 2 | 5 | | 5 | 1 | 13 |
| | 3 | 10 | 5 | | 4 | 2 |
| | 4 | 10 | 1 | 4 | | 10 |
| | 5 | 20 | 13 | 2 | 10 | |

For initial cluster states of $W_1=\{1\}$, $W_2=\{2\}$, $W_3=\{3\}$, $W_4=\{4\}$ and $W_5=\{5\}$, a first merging is effected as described below.

(ii) Distance between clusters is determined as follows: $D_{12}=5$, $D_{13}=10$, $D_{14}=10$, $D_{15}=20$, $D_{23}=5$, $D_{24}=1$ (minumum), $D_{25}=13$, $D_{34}=4$, $D_{35}=2$ and $D_{45}=10$.

(iii) Clusters $W_2$ and $W_4$ between which the distance is minimum are merged. For cluster states of $W_1=\{1\}$, $W_2=\{2, 4\}$, $W_3=\{3\}$ and $W_5=\{5\}$ resulting from the first merging, a second merging is effected as described below.

(ii) $D_{12}=10$, $D_{13}=10$, $D_{15}=20$, $D_{23}=5$, $D_{25}=13$ and $D_{35}=2$ (minimum)

(iii) Clusters $W_3$ and $W_5$ between which the distance is minimum are merged. For cluster states of $W_1=\{1\}$, $W_2=\{2, 4\}$ and $W_3=\{3, 5\}$ resulting from the second merging, a third merging is effected as described below.

(ii) $D_{12}=10$ (minimum), $D_{13}=20$ and $D_{23}=13$ (iii) Clusters $W_1$ and $W_2$ between which the distance is minimum are merged. For cluster states of $W_1=\{1, 2, 4\}$ and $W_3=\{3, 5\}$ resulting from the third merging, a fourth merging is effected as described below.

(ii) $D_{13}=20$ (minimum)

(iii) Clusters $W_1$ and $W_3$ are merged. As a result of the fourth merging, only one merging cluster of $W_1=\{1, 2,$ 3, 4, 5} is obtained, reaching M=1, and the merging processing ends.

As a measure for quality of results of the cluster classification, a ratio $R_\mu$ between inter-average distance and intra-average distance of clusters is defined as follows:

$$R_\mu = \frac{\text{cluster inter-average distance } \mu_{int}}{\text{cluster intra-average distance } \mu_{in}} \quad (2)$$

where $$\mu_{in} = \frac{1}{M} \sum_i^M \frac{1}{m_i(m_i-1)} \sum_k^{m_i} \sum_l^{m_i} d(x_k^{(i)}, x_l^{(i)})$$

and $$\mu_{int} = \frac{1}{M(M-1)} \sum_i^M \sum_j^M \frac{1}{m_i m_j} \sum_k^{m_k} \sum_l^{m_l} d(x_k^{(i)}, x_l^{(j)}).$$

The larger the distance ratio $R_\mu$, the smaller the overlap between the clusters becomes, providing fine separation. The present invention also provides a method which makes use of the ratio $R_\mu$ to determine the number of clusters with fine separation.

Figure 3:
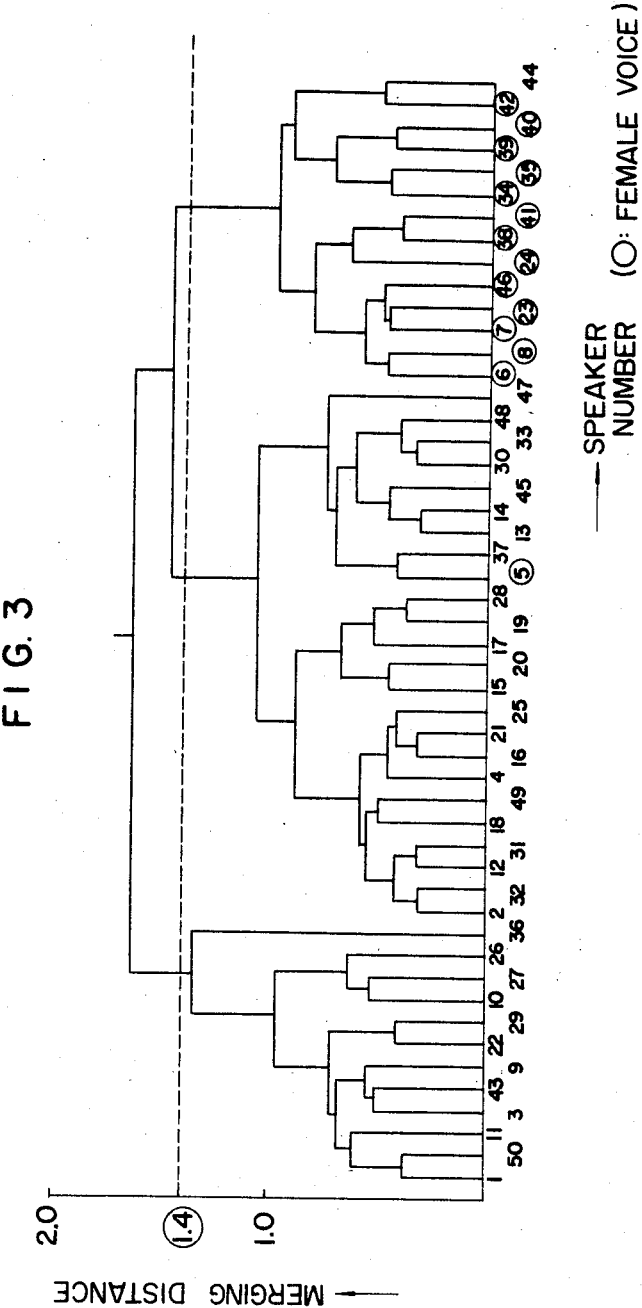
FIG. 3 is a graph showing cluster merging process when speeches /hai/ spoken by 50 speakers are subjected to a hierarchical clustering technique.

FIG. 3 shows results of hierarchical clustering employed for the first step for classification based on physical features of speakers, which clustering uses a speech /hai/ which is relatively stable by utterance. In the figure, the abscissa represents speaker numbers and the ordinate represents values of the distance for merging (likelihood ratio). As the distance increases, an initial 50 clusters successively merge into an ultimate single cluster. Consequently, three sets of clusters, for example, can be obtained at a merging distance of about 1.4, and speakers can be classified almost completely in accordance with male voice and female voice as follows:

$$\left.\begin{array}{l} W_1 = \{1, 3, 9, 10, 11, 22, 26, 27, 29, 36, 43, 50\} \\ W_2 = \{2, 4, ⑤, 12, 13, 14, 15, 16, 17, 18, 19, \\ \quad 20, 21, 25, 28, 30, 31, 32, 33, 37, 45, 47, \\ \quad 48, 49\} \\ W_3 = \{⑥, ⑦, ⑧, ㉓, ㉔, ㉞, ㉟, ㊳, \\ \quad ㊴, ㊵, ㊶, ㊷, 44, ㊻\} \end{array}\right\} \quad (3)$$

(mark "o" denote female voice) In the second step, a speech /ichi/ spoken by the speakers classified into the above sets is used to classify each of the sets into two clusters in accordance with the previous classification precedure. Results are expressed as, $$W_1 - \begin{bmatrix} W_1 = \{1, 9, 10, 22, 27, 36, 43, 50\} \\ W_2 = \{3, 11, 26, 29\} \\ \triangle \triangle \triangle \triangle \end{bmatrix}$$

$$W_2 - \begin{bmatrix} W_3 = \{2, ⑤, 13, 16, 17, 18, 19, 20, \\ \quad 21, 30, 31, 32, 33, 34, 45, 48, 49\} \\ W_4 = \{4, 12, 14, 15, 25, 28, 37, 47\} \\ \triangle \triangle \triangle \triangle \triangle \triangle \triangle \triangle \end{bmatrix} \quad (4)$$

$$W_3 - \begin{bmatrix} W_5 = \{⑦, ⑧, ㉓, ㉔, ㉟, ㊳, \\ \quad ㊴, ㊵, ㊶, 44\} \\ W_6 = \{⑥, ㉞, ㊷, ㊻\} \\ \triangle \triangle \triangle \triangle \end{bmatrix}$$

When compared with equation (1) mentioned previously, the above results show that classification of speakers of male voice and female voice and classification of unvoicing speeches and voiced speeches can be accomplished properly and reliably and hence it is justified by the above results that the method according to the invention is highly effective which performs the classification based on physical features of speakers in the first step and the classification based on features of speech which occur by utterance in the second step.

Figure 4:
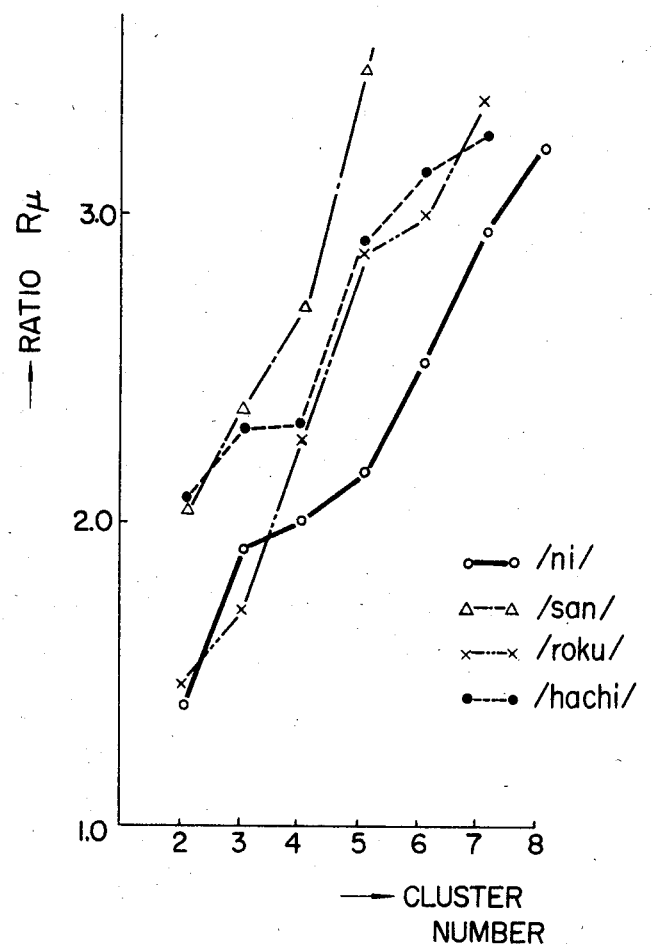
FIG. 4 is a graph showing changes in cluster distance ratio which measures precision of cluster when applying the hierarchical clustering technique.

Turning now to FIG. 4, the manner of determining the number of clusters suitable for the classification will be described. FIG. 4 shows the ratio $R\mu$ as defined by equation (2) when the hierarchical clustering is applied to speeches spoken by 20 speakers. In the figure, the abscissa represents the number of clusters. On the assumption that feature factors of speeches are arranged on a plane, it is experimental recognition that the clusters are properly separated when the ratio $R\mu$ is 2.0 or more. With /san/ and /hachi/, two clusters suffice for classification of proper separation whereas with /ni/ and /roku/, four clusters are necessary. Accordingly, the clustering applicable in common to the respective speeches for assuring proper separation can be performed by determining the number of clusters which makes the ratio $R\mu$ 2.0, for example.

Figure 5:
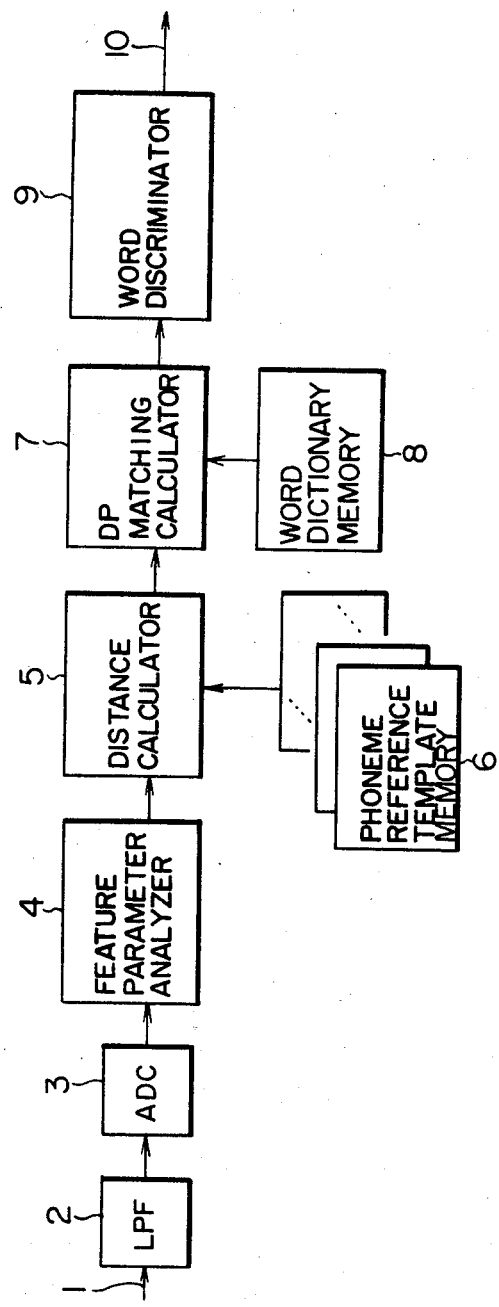
FIG. 5 is a block diagram of a speech recognition apparatus incorporating the invention.

FIG. 5 illustrates, in block form, an embodiment of a speech recognition apparatus incorporating the invention. An input speech 1 is passed through a lowpass filter (LPF) 2 at which its high frequency components are cut out for elimination of turning noise which otherwise would occur when sampling, and is then converted into a digital value at an analog to digital converter (ADC) 3. Subsequently, a feature parameter of the input speech is determined at a feature parameter analizer 4. Used as the feature parameter is, for example, a self-correlation coefficient, various parameters as a result of analysis of linear predictive coefficients (LPC) and a filter bank value. After determination of the feature parameter, the distance (for example, likelihood ratio or Euclid distance) between a feature parameter of a phoneme constituting respective speeches read from plural phoneme reference template memories 6 and the feature parameter of the input speech is determined at a distance calculator 5. The distance calculator 5 comprises a multiplier and an adder or a subtractor. Subsequently, on the basis of the distance from the phoneme reference template and information indicative of a time structure of a speech read from a word dictionary memory 8, the total distance between the input speech and a word constituting the word dictionary as well as the time structure are calculated at a DP matching calculator 7, and thereafter the magnitudes of the total distance are compared at a word discriminator 9 to produce an output 10 representative of the results of recognition. The method of the present invention participates in production of reference templates to be stored in the phoneme reference template memories 6.

Figure 6:
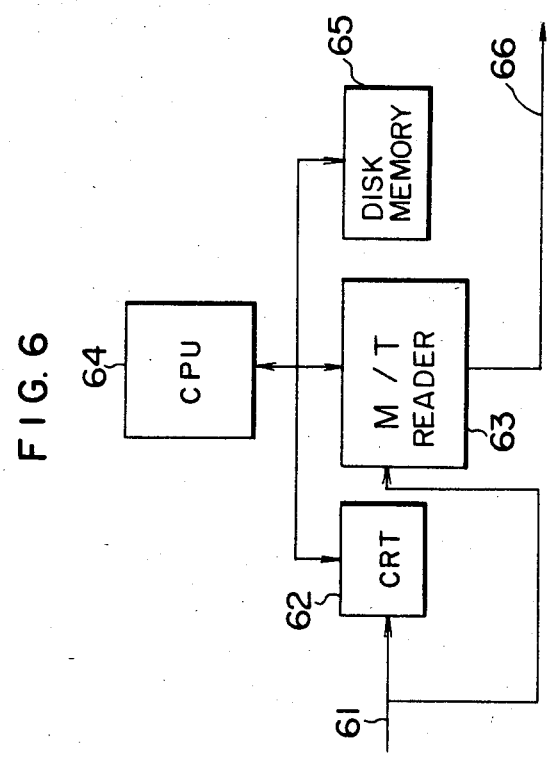
FIG. 6 is a block diagram of a reference template producer embodying the invention.

FIG. 6 illustrates an embodiment of a reference template producer according to the invention. Input information 61 such as speech data necessary for production of reference templates and various input parameters necessary for operation are inputted to a CRT 62 and an M/T reader 63, and processing based on the principle of the present invention is carried out at a CPU 64. The processing is effected through the organic use of CRT 62, M/T reader 63 and disk memory 65, and reference template information is delivered out of the M/T reader 63 as output information 66.

Figure 7:
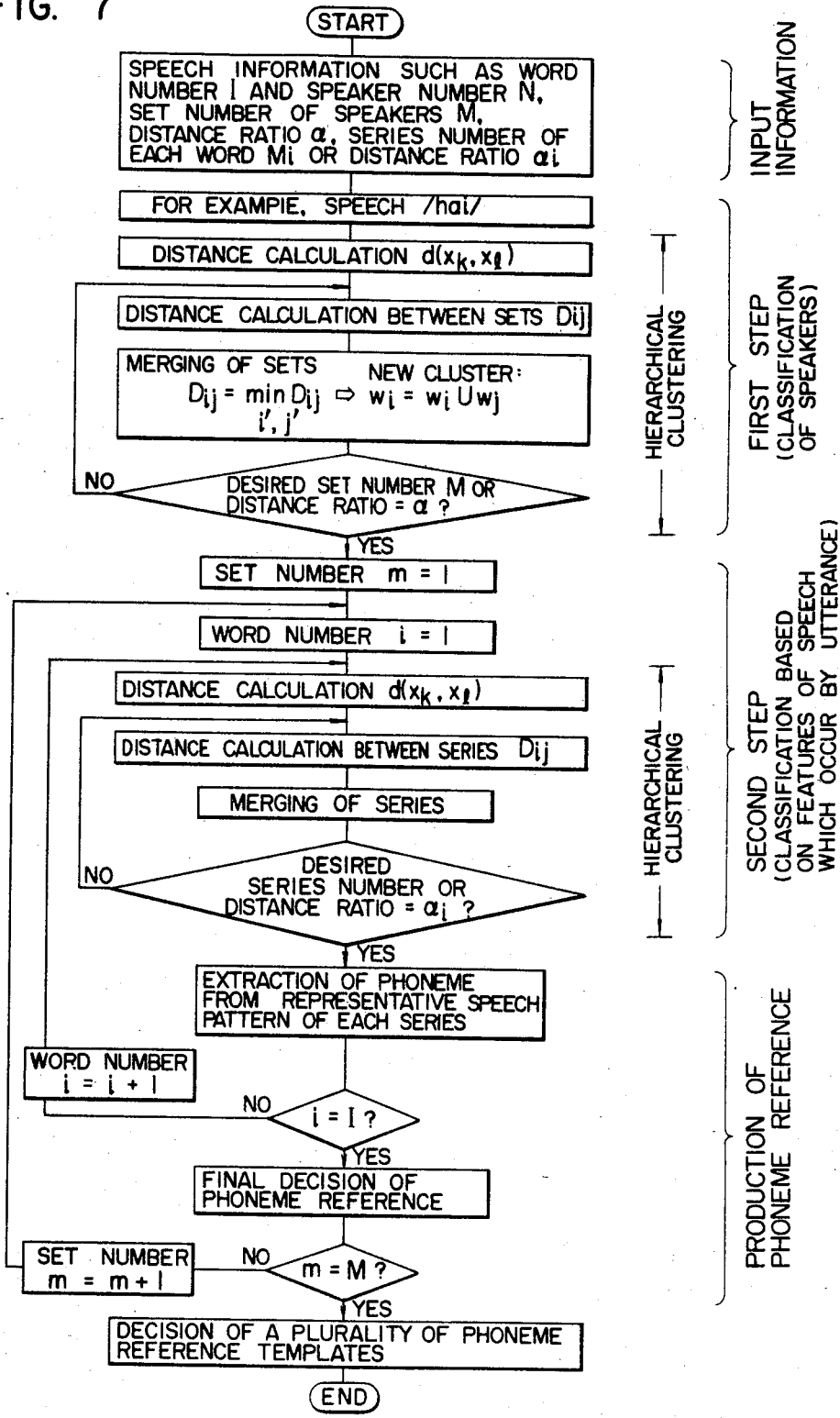
FIG. 7 is a flow chart of reference template production processing according to the invention.

The processing of the CPU 64 to be performed in accordance with teachings of the present invention will specifically be described with reference to a flow chart as shown in FIG. 7. Firstly, input information including such speech information as the number of speakers N and the number of words I and a desired number of sets of speakers is inputted and the classification of the speakers in the first step (based on the physical features) is carried out by using a word, for example, a speech /hai/ which is relatively stable by utterance. Procedure of this classification continues in accordance with the hierarchical clustering procedures (i) to (iv) grounded on the principle of the invention until the number of sets of speakers reaches a desired set number M or the ratio $R\mu$ equals $\alpha$. Thereafter, the classification in the second step based on features which occur by utterance is likewise carried out in respect of words in each set of speakers by using the hierarchical clustering so as to decide sets (series) within each word. Further, a phoneme is picked up from a representative speech pattern of each series within the word. This picking up is carried out for all the words to determine a set of phoneme reference templates. By effecting this processing for each set of speakers, plural sets of phoneme reference templates (multi-template) can be decided.

As has been described, according to the invention, the physical features of speakers and the features of speech which occur by utterance that are coexistent in the form of convolution in the speech feature can be separated from each other, thereby making it possible to produce highly precise reference templates representative of details of speeches spoken by a number of speakers. In addition, the classification without resort to initial, representative speech patterns can be accomplished through the hierarchical clustering.

What is claimed is:

1. A method for production of speech reference templates for phoneme groups for use in speech recognition, each of said phoneme groups containing at least one phoneme, the method comprising the steps of:

preparing first speech patterns with respect to speeches of plural speakers, said first speech patterns corresponding to a word which is stable by utterance;

classifying said speeches of said plural speakers into speech groups by use of differences in said first speech patterns caused by physical features of said speakers;

preparing second speech patterns with respect to said speeches of said plural speakers, said speech patterns corresponding to a phoneme group containing at least one phoneme;

subclassifying the speeches of said plural speakers in each of said speech groups into speech subgroups by the use of differences in said second speech patterns caused by features of speech occurring by utterance; and selecting a plurality of second speech patterns among the second speech patterns in each of said speech subgroups and assigning said selected plurality of second speech patterns to be the speech reference template for each of said phoneme groups.

2. A method according to claim 1, wherein said classifying and subclassifying of the speeches of said plural speakers are carried out through hierarchical clustering in which, in each of said speech groups and speech subgroups, the speeches of said plural speakers are hierarchically grouped into a predetermined number of sets in terms of the degree of similarity in their speech patterns.

3. A method according to claim 1, wherein the predetermined number of sets in each of said speech groups and speech subgroups is decided on the basis of the ratio between a value related to the similarity among the speech patterns in each of said speech groups or speech subgroups and a value related to the similarity of the speech patterns among said speech groups or speech subgroups.

* * * * *